United States Patent
Kim

(10) Patent No.: US 11,428,945 B2
(45) Date of Patent: Aug. 30, 2022

(54) HEAD-UP DISPLAY FOR VEHICLE AND METHOD FOR CONTROLLING THE SAME

(71) Applicant: HYUNDAI MOBIS CO., LTD., Seoul (KR)

(72) Inventor: Byung Ki Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/324,319

(22) Filed: May 19, 2021

(65) Prior Publication Data

US 2021/0364810 A1 Nov. 25, 2021

(30) Foreign Application Priority Data

May 20, 2020 (KR) .................. 10-2020-0060150

(51) Int. Cl.
| | |
|---|---|
| *G02B 27/01* | (2006.01) |
| *G09G 5/38* | (2006.01) |
| *G09G 3/00* | (2006.01) |
| *G01B 21/16* | (2006.01) |
| *G01B 21/22* | (2006.01) |
| *B60K 35/00* | (2006.01) |

(52) U.S. Cl.
CPC .......... *G02B 27/0179* (2013.01); *B60K 35/00* (2013.01); *G01B 21/16* (2013.01); *G01B 21/22* (2013.01); *G02B 27/0101* (2013.01); *G09G 3/002* (2013.01); *G09G 5/38* (2013.01); *B60K 2370/12* (2019.05); *B60K 2370/1529* (2019.05); *G02B 2027/0181* (2013.01); *G02B 2027/0187* (2013.01); *G09G 2354/00* (2013.01); *G09G 2380/10* (2013.01)

(58) Field of Classification Search
None
See application file for complete search history.

(56) References Cited

U.S. PATENT DOCUMENTS

| | | | |
|---|---|---|---|
| 7,860,626 B2 * | 12/2010 | Breed | G01G 23/3728 |
| | | | 180/271 |
| 9,317,106 B2 * | 4/2016 | Su | G06V 20/597 |
| 10,592,078 B2 * | 3/2020 | Wild | G06F 3/0304 |
| 2004/0178894 A1 * | 9/2004 | Janssen | G01C 21/365 |
| | | | 348/148 |

(Continued)

*Primary Examiner* — Jason A Pringle-Parker
(74) *Attorney, Agent, or Firm* — NovoTechIP International PLLC

(57) ABSTRACT

A vehicle head-up display that automatically repositions an eyebox by measuring a distance to a driver's face and a method of controlling the same are disclosed. A method of controlling a vehicle head-up display according to some embodiments includes performing a distance measurement by using a displacement sensor for measuring a distance to a face of a driver and performing a display position adjustment including adjusting a display position and a display angle of head-up display information based on a measured distance to the face of the driver. Positioning of driver's face and then automatically adjusting the display position and the display angle of the head-up display information adaptively to individual drivers can reduce the inconveniences of the manual setting of the head-up display in a vehicle frequented with car-sharing drivers.

20 Claims, 5 Drawing Sheets

(56) References Cited

U.S. PATENT DOCUMENTS

| | | | |
|---|---|---|---|
| 2006/0262140 A1* | 11/2006 | Kujawa | G06T 7/74 |
| | | | 345/633 |
| 2012/0050138 A1* | 3/2012 | Sato | G02B 27/01 |
| | | | 345/4 |
| 2012/0053793 A1* | 3/2012 | Sala | B60N 2/0244 |
| | | | 701/45 |
| 2014/0160012 A1* | 6/2014 | Su | G06V 40/165 |
| | | | 345/156 |
| 2014/0368544 A1* | 12/2014 | Kobayashi | G06T 19/006 |
| | | | 345/633 |
| 2015/0235355 A1* | 8/2015 | Mullins | G02B 27/0093 |
| | | | 345/633 |
| 2015/0314682 A1* | 11/2015 | Enriquez Ortiz | G02B 30/30 |
| | | | 701/49 |
| 2015/0373321 A1* | 12/2015 | Bridges | G01S 17/89 |
| | | | 348/46 |
| 2016/0063761 A1* | 3/2016 | Sisbot | B60W 50/14 |
| | | | 345/633 |
| 2017/0169612 A1* | 6/2017 | Cashen | G06T 7/50 |
| 2020/0210733 A1* | 7/2020 | Noble | G06V 40/193 |

* cited by examiner

HEAD-UP DISPLAY FOR VEHICLE AND METHOD FOR CONTROLLING THE SAME

CROSS-REFERENCE TO RELATED APPLICATIONS

This application is based on, and claims priority from, Korean Patent Application Number 10-2020-0060150, filed May 20, 2020, the disclosure of which is incorporated by reference herein in its entirety.

TECHNICAL FIELD

The present disclosure in some embodiments relates to a head-up display for vehicles and a method of controlling the same. More specifically, the present disclosure relates to a vehicle head-up display that provides a display with an eyebox repositioned according to the driver's eye level and a method of controlling the same.

BACKGROUND

The statements in this section merely provide background information related to the present disclosure and do not necessarily constitute prior art.

Head-Up Display (HUD) is an apparatus that displays various vehicle information in the form of virtual images on the front windshield of a vehicle or a separate screen so that the driver can check vehicle information while continuing to look ahead for driving the vehicle. Two types of head-up displays are provided, including a windshield type that displays on the vehicle windshield and a combiner type that displays on a separate screen. The head-up display may be configured as disclosed in Korean Patent Registration No. 15757292 or Korean Patent Registration No. 1397046 to display an image projected from a display device on a windshield or a combiner by using an optical system.

As shown in FIG. 1, images displayed on the windshield or combiner are displayed at different elevations depending on the driver's eye level. For example, a driver with a lower eye level than given settings may get the image truncated at its bottom portion, and a driver with a higher eye level may see the image truncated at its top portion. Therefore, the driver needs to adjust the HUD eyebox to the personal level that permits the most comfortable viewing of the informative image.

The driver can manually adjust the position of the eyebox through a HUD manipulator (Human Machine Interface or HMI), and the eye level once set is maintained even at the next vehicle start-up. However, when shared by different drivers with individual eye levels, the vehicle needs the eyebox to be repositioned, and even for the same driver, the eyebox is subject to cumbersome repositioning to regain the right eyebox position after every adjustment of the seat position or the backrest angle.

SUMMARY

According to at least one embodiment, the present disclosure provides a method of controlling a head-up display for a vehicle, including performing a distance measurement by using a displacement sensor for measuring a distance to a face of one or more drivers and performing a display position adjustment comprising adjusting a display position and a display angle of head-up display information based on the measured distance to the face of the driver. The performing of the distance measurement may include measuring distances at a plurality of measurement angles of the displacement sensor while adjusting the measurement angles up and down, and calculating the distance to the face based on measured distances at the plurality of measurement angles.

According to another embodiment, the present disclosure provides a head-up display for a vehicle, including a displacement sensor, a light source and a display panel combined, an optical system, and a control unit. The displacement sensor is configured to measure a distance to the face of one or more drivers. The light source and a display panel are configured to display at least vehicle driving information. The optical system is configured to project an image displayed on the display panel onto a windshield or a combiner and to control the position and an angle of the image to be displayed. The control unit is configured to adjust a display position and a display angle of head-up display information based on a measured distance to the face of the driver. The head-up display according to at least one embodiment further includes a displacement sensor angle controller configured to control measurement angles of the displacement sensor. Here, the control unit measures distances at a plurality of measurement angles of the displacement sensor while adjusting the measurement angles up and down and calculates the distance to the face based on measured distances at the plurality of measurement angles.

The control unit may perform the calculating of the distance to the face by determining, as a measurement angle corresponding to a starting position of the face, from among the plurality of measurement angles of the displacement sensor, a first measurement angle that causes to generate a measured distance that is first to decrease at a predetermined rate or higher after a highest measurement angle through gradually lowered measurement angles at which measured distances are incrementally generated. Some embodiments determine whether or not all of the measured distances at a predetermined number of measurement angles after the first measurement angle is within a predetermined range from the measured distance at the first measurement angle, and if yes, determine the first measurement angle as the measurement angle corresponding to the starting position of the face.

Some embodiments calculate the distance to the face based on the measured distance at the first measurement angle and at least one of the measured distances at the predetermined number of measurement angles after the first measurement angle.

Some embodiments calculate the distance to the face based on, from among the measured distances at the plurality of measurement angles, at least some of measured distances at one or more measurement angles that cause the measured distances to be generated smaller by at least a predetermined ratio than a measured distance at the highest measurement angle.

The control unit may perform the display position adjustment by adjusting the display position and the display angle of the head-up display information based on the measured distance at the first measurement angle and the first measurement angle.

The head-up display further includes a head-up display of a combiner type in which a combiner is housed in the vehicle by default and deployed when needed to display vehicle information. In some embodiments, the displacement sensor is located in the combiner. The control unit when performing the distance measurement may adjust the measurement angles by adjusting the tilting angle of the combiner.

Before the performing of the distance measurement, a driver-position integrated memory system (IMS) may perform a seat position adjustment according to driver position information for each of the drivers. The control unit is configured to read the driver position information including information on the distance to the face of the driver from the driver-position integrated memory system (IMS), and to provide a driver mismatch indication or driver absence indication responsive to when the measured distance to the face of the driver differs by at least a predetermined ratio from the information on the distance to the face of the driver, included in the driver position information.

Some embodiments provide configurations for adjusting the display position and the display angle of the head-up display information based on data from a seat pressure sensor and the measured distance to the face of the driver.

Some embodiments determine a driver's absence in response to when every one of the measured distances at the plurality of measurement angles is greater than a reference distance.

DETAILED DESCRIPTION

Figure 1:
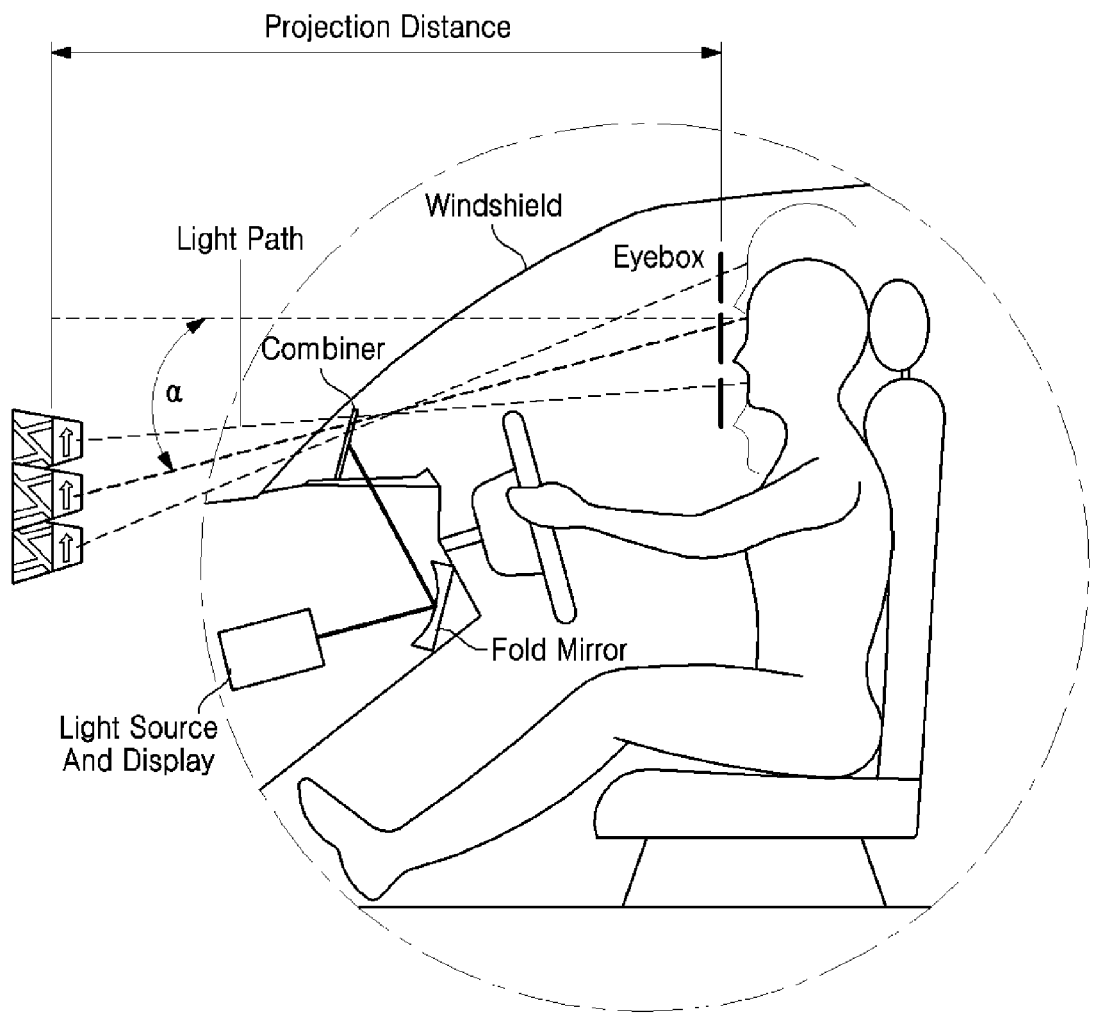
FIG. 1 is a conceptual diagram illustrating different driver's eye levels rendering images to be displayed at different elevations across a windshield.

The present disclosure has been made in view of the aforementioned issues and seeks to provide a vehicle head-up display for automatically adjusting the position of the eyebox by measuring the distance to the driver's face and a method of controlling the same.

Some exemplary embodiments of a head-up display for vehicles of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

Figure 2:
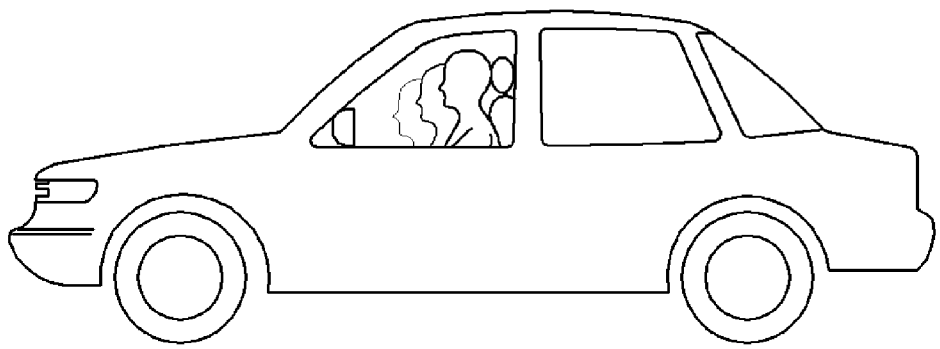
FIG. 2 is a conceptual diagram illustrating different driver's eye levels result in varying distances to a dashboard.

FIG. 2 is a conceptual diagram illustrating different driver's eye levels result in varying distances to a dashboard. The eye level is somewhat proportional to the driver's height. In other words, it is common for one to sit higher as the height increases, which leads to increased eye level. On the other hand, a driver with a taller stature than the average would accordingly adjust the driver's seat further backward of the average seat position, and a driver of short stature would correspondingly move the driver's seat forward of the average seat position. Accordingly, the distance from the driver's dashboard to the driver's face has a proportional relationship to the driver's height to some extent. Given this, the present disclosure automatically adjusts the position of the eyebox by estimating the driver's eye level from the distance to the driver's face.

Figure 3:
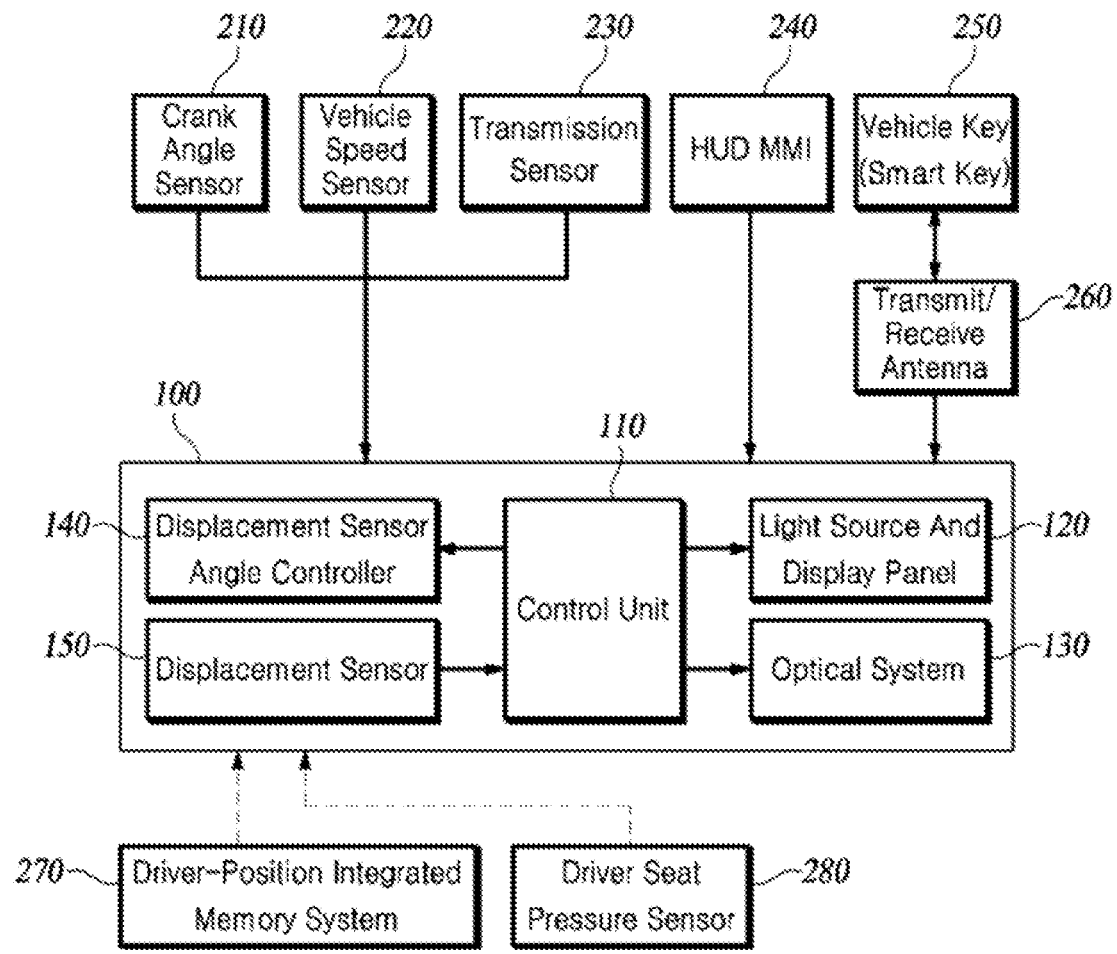
FIG. 3 is a schematic block diagram of a configuration of a vehicle head-up display according to at least one embodiment of the present disclosure.

FIG. 3 illustrates a configuration of a vehicle head-up display 100 according to at least one embodiment of the present disclosure.

The vehicle head-up display 100 includes a light source and display panel 120 for displaying at least driving information of a vehicle, an optical system 130 for projecting an image displayed on a display panel onto a windshield or a combiner and controlling the display position and the display angle, a displacement sensor angle controller 140 for controlling the direction (measurement angle) of a displacement sensor 150 which is included for measuring a distance to the driver's face, and a control unit 110 for controlling the operation of the aforementioned components.

The control unit 110 generates information to be displayed from data supplied by various in-vehicle sensors or input means, including a crank angle sensor 210, a vehicle speed sensor 220, a transmission sensor 230, a user interface 240, and a vehicle key 250 inputted through a transmit/receive antenna 260, etc. The generated information is displayed and projected as an image by the light source and display panel 120, and the projected image is rendered onto the windshield or combiner at an appropriate angle through the optical system 130. To this end, the control unit 110 controls the light projection angle and/or position of the optical system 130. The head-up display when implemented in the combiner type may be configured to save the optical system 130 and instead allow the image from the light source and display panel 120 to be projected right onto the combiner. In this case, the control unit 110 may control the angle of projection from the light source and display panel 120. Further, in the combiner-type head-up display, the control unit 110 may be configured to control the tilting angle of the combiner by calculating, based on the distance to the driver's face, the optimal combiner angle for the driver's viewing convenience. Some embodiments further provide a sensor for detecting the current position of a mirror for reflecting light.

Upon detecting the vehicle start-up, the control unit 110 controls the displacement sensor angle controller 140 to adjust the measurement angle of the displacement sensor 150 while measuring the distance from the displacement sensor 150 to the driver's face. In at least one embodiment, the control unit 110 measures distance at a plurality of measurement angles while adjusting the measurement angle of the displacement sensor 150 up and down, and it calculates the distance to the face based on the measured distances at the plurality of measurement angles. In at least one embodiment of the combiner type, the displacement sensor 150 is installed in the combiner.

Some embodiments determine the driver's absence or the driver's mismatch by utilizing the measured distance to the driver's face and information from a driver-position integrated memory system or driver-position IMS 270. For example, upon starting the vehicle and after the driver-position IMS 270 adjusts the seat position according to driver's posture information, some embodiments compare the information on the distance to the driver's face included in the driver's posture information read from the driver-position IMS 270 with the measured distance from the displacement sensor 150. When the two compared differ by more than a predetermined ratio, a driver mismatch indication or a driver absence indication is displayed. In sum, when it is determined from the measured distance that there is no driver, the driver's absence is displayed, and when a driver is present but with inconsistent distance information items to the face, the driver's mismatch is displayed. With this configuration, the head-up display can detect whether the driver is absent even without a driver seat pressure sensor 280.

Some embodiments utilize information from the driver seat pressure sensor 280. Taking advantage of the pressure variation as applied to the driver's seat according to the driver's posture change, some embodiments are configured to determine whether the current posture assumed by the driver is laying back in the seat or leaning forward toward the steering wheel and to combine the determined posture data and the information on the measured distance, and thereby determine an appropriate projection angle and/or position. Some embodiments are configured to further consider seat position information from the driver-position IMS 270 to determine an appropriate projection angle and/or position.

Figure 4:
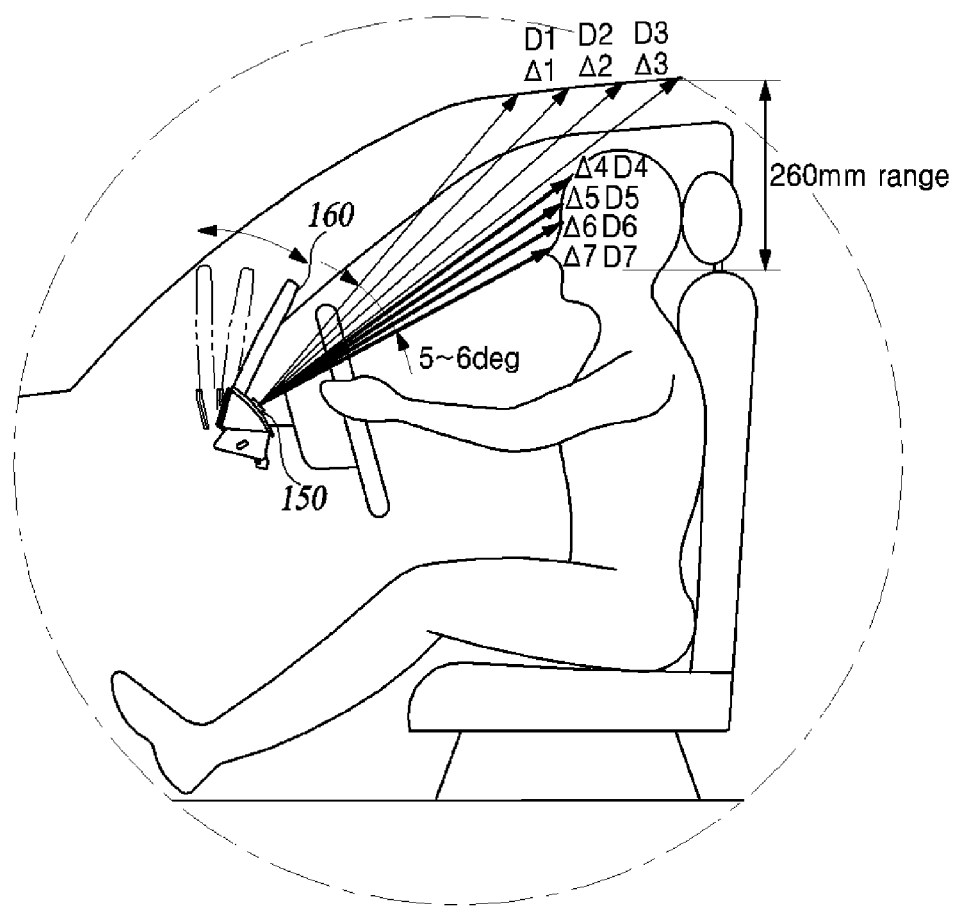
FIG. 4 is a conceptual diagram illustrating a principle of measuring distances to a driver's face according to at least one embodiment of the present disclosure.
Figure 5:
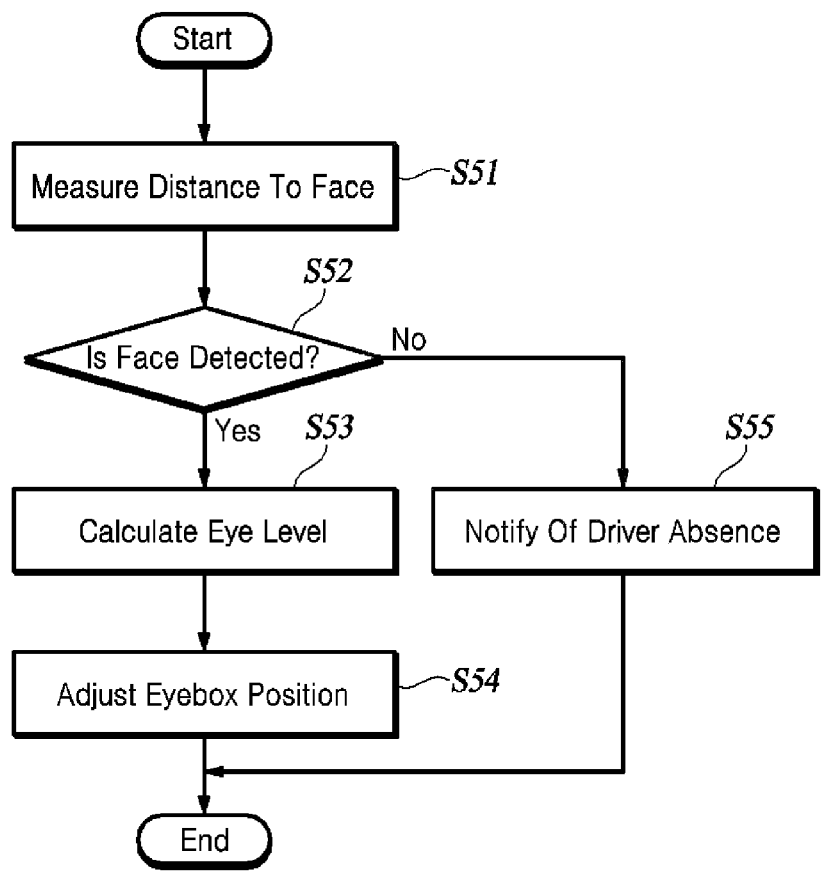
FIG. 5 is a flowchart of an operation of controlling a display angle of a vehicle head-up display according to at least one embodiment of the present disclosure.

The following describes a specific method of measuring the distance to the driver's face according to at least one embodiment of the present disclosure referring to FIGS. 4 and 5.

FIG. 4 is a conceptual diagram illustrating a principle of measuring distances to a driver's face according to at least one embodiment of the present disclosure. Making distance measurements while changing the measurement angle of the displacement sensor 150 installed on the combiner, dashboard, or other places allows obtaining measured distances at a plurality of measurement angles. The example of FIG. 4 shows a case in which the displacement sensor 150 is installed in the combiner 160. As shown in FIG. 4, seven distance measurements made with the displacement sensor 150 while changing the angle of the combiner 160 provides seven distance measurement data D1 to D7. The total rotational displacement of the combiner 160 may be 5 degrees to 6 degrees, which, however, may be appropriately redesigned according to the vehicle structure. Instead of installing the displacement sensor 150 on the combiner 160, the displacement sensor 150 may also be installed on the dashboard, to be rotated vertically at predetermined angles.

In the example configuration of FIG. 4, measured distances D1 to D3 are greater than D4 to D7. Additionally, the measured distance gradually increases from D1 through D3, and then suddenly decreases at D4. At least one embodiment of the present disclosure identifies the highest measurement angle through gradually lowered measurement angles among a plurality of measurement angles, at which the measured distances are incrementally generated and determines the first measurement angle that causes to generate a measured distance that is first to decrease at a predetermined rate or higher and thereby identifies the first measurement angle as a measurement angle corresponding to a starting position of the face. For example, an angle at which the measured distance decreases by 30% or more may be determined as the measurement angle corresponding to the starting position of the face.

The present disclosure in some embodiments is configured to identify the highest measurement angle through gradually lowered measurement angles among a plurality of measurement angles, at which the measured distances are incrementally generated and determine the first measurement angle that causes to generate a measured distance that is first to decrease at a predetermined rate or higher. The present disclosure may then determine whether or not all of the measured distances at a predetermined number of measurement angles after the first measurement angle is within a predetermined range from the measured distance at the first measurement angle, and if yes, determine the first measurement angle as the measurement angle corresponding to the starting position of the face. In the example of FIG. 4, the measured values of D4 to D7 do not differ significantly. For example, when the predetermined range is set to ±10% and there are three or more places that cause to generate three or more measured distances within the range of ±10%, the first measurement angle of those three or more may be determined as the measurement angle corresponding to the starting position of the face.

In some cases, a hatted driver may cause the measurement distance error at the head to appear larger than that in the ordinary case. Some embodiments are configured to cover such a case by overriding one or two measured values deviating from the predetermined range, thereby allowing an accurate distance measurement. Alternatively, the distance to the face may be calculated by using the measured distance at the first measurement angle and an average value or a median value of the measured distances at a predetermined number of measurement angles after the first measurement angle.

Some embodiments are configured to identify the presence of a face based on the measured distance at the highest measurement angle. In particular, embodiments are configured to identify one or more measurement angles that cause the measured distances to be generated smaller by at least a predetermined ratio than the measured distance at the highest measurement angle and to determine the same one or more measurement angles as the measurement angle corresponding to the starting position of the face. Similarly, the embodiments calculate the distance to the face based on an average value or a median value of the measured distances at the one or more measurement angles that cause the measured distances to be generated smaller by at least the predetermined ratio than the measured distance at the highest measurement angle. One or two measured values, which deviate from the predetermined range, are tolerated in some embodiments.

On the other hand, the absence of a measured distance that satisfies the face determination criterion may be determined as the driver's absence. For example, some embodiments identify such measured distances that are incrementally generated at the highest measurement angle through gradually lowered measurement angles among a plurality of measurement angles and determine a driver absence unless there is a measured distance that is generated smaller by at least a predetermined ratio than the measured distances that are incrementally generated. Another embodiment determines a driver's absence unless there is a measured distance that is generated smaller by at least a predetermined ratio than the measured distance at the highest measurement angle. Upon determining the driver's absence, the embodiments can utilize a smart key as provided in the vehicle for detecting and alerting the driver's absence or other situations after the vehicle start-up or take the determined absence as a control signal for safety devices to incapacitate the vehicle from starting up among other applications.

Some embodiments utilize data of the measured distances to the driver's face in adaptable settings to one's body shape, including a steering wheel position, an accelerator/brake pedal position, and the like. For example, when the distance to the driver's face is closer than the average distance, the steering wheel position and/or the accelerator/brake pedal position can be set to suit a driver of short stature.

FIG. 5 is a flowchart of an operation of controlling a display angle of a vehicle head-up display according to at least one embodiment of the present disclosure.

The control unit 110 measures the distance to the driver's face by using the displacement sensor 150 as described above (Step S51). Distances are measured while changing the measurement angle of the displacement sensor 150 to obtain measured distances at a plurality of measurement angles. Determination is made on whether the driver's face is detected from the obtained measured distances as described above (Step S52). Upon detecting a face, the driver's eye level is calculated by using the measured distance (Step S53). The distance to the face is calculated from the measured distance, and the driver's eye level is calculated from the calculated distance to the face. The control unit 110 adjusts, based on the calculated eye level, the optical system 130 or the angle of the combiner 160, thereby repositioning the eyebox (Step S54). The eye-level calculation may use, for example, a conversion table for converting the distance to the face to the driver's eye level. Alternative embodiments calculate up to the distance to the face for use in the repositioning of the eyebox, saving a separate calculation of the eye level. On the other hand, when Step S52 determines that no face is detected, the driver's absence is notified to a central control unit of the vehicle (Step S55).

Figure 6:
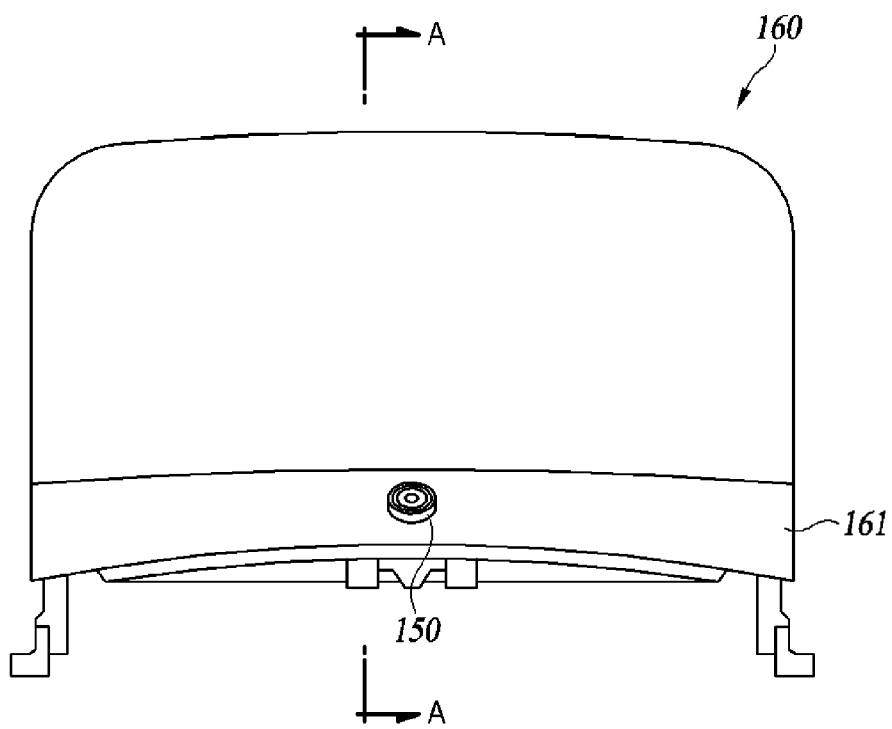
FIG. 6 is a front view of a vehicle head-up display of a combiner type, illustrating a displacement sensor installed in a combiner.
Figure 7:
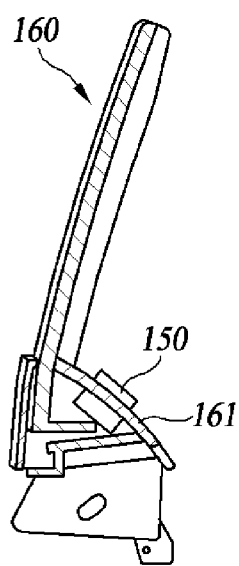
FIG. 7 is a cross-sectional view of a vehicle head-up display of a combiner type, illustrating a displacement sensor installed in a combiner.

The following describes an example installation of the displacement sensor 150 in the combiner 160 in the combiner-type vehicle head-up display referring to FIGS. 6 and 7. FIG. 6 is a front view of a vehicle head-up display of a combiner type, illustrating the displacement sensor 150 installed in the combiner 160, and FIG. 7 is a cross-sectional view taken along line A-A of FIG. 6.

As shown in FIG. 6, the displacement sensor 150 may be installed in a flap portion 161 of the combiner 160. As is typical for a head-up display, the combiner 160 is normally accommodated in the dashboard and protrudes above the dashboard for operation. In at least one embodiment, the combiner 160 is tilted vertically at predetermined angles as shown in FIG. 4. As illustrated in FIGS. 6 and 7 where the displacement sensor 150 is fixed to the flap portion 161 of the combiner 160, as the combiner 160 tilts up and down, the measurement angle of the displacement sensor 150 moves up and down as shown in FIG. 4. In these embodiments, a combiner tilting angle control means is used as the displacement sensor angle controller 140. In particular, when measuring the distance to the driver's face, the measurement angle of the displacement sensor 150 is adjusted by adjusting the tilting angle of the combiner 160. A combiner tilting structure is disclosed, for example, in Korean Patent Application Publication 10-2018-0102395 and Korean Patent Application Publication 10-2019-0115786 among others, although the present disclosure is not limited to a specific combiner tilting structure.

The positioning of the driver's face and then automatically adjusting the display position and the display angle of the head-up display information adaptively to individual drivers can reduce the inconveniences of the manual setting of the head-up display in a vehicle frequented with car-sharing drivers.

The head-up display of some embodiments can increase the accuracy of positioning the driver's eye by using the driver's position sensing with a driver-position integrated memory system or a seat pressure sensor.

The head-up display of some embodiments allows data of the measured distances to the driver's face to be utilized in adaptable settings to one's body shape, including a steering wheel position, an accelerator/brake pedal position, and the like.

The head-up display of some embodiments can determine the absence of a driver by detecting when the measured distances at a plurality of measurement angles are greater than the reference distance, which obviates the need for a seat pressure sensor in determining whether the driver is absent. This ability can be used for issuing safety-related warnings or used as a control signal for safety devices to incapacitate vehicles from starting up among other applications.

Although exemplary embodiments of the present disclosure have been described for illustrative purposes, those skilled in the art will appreciate that various modifications, additions, and substitutions are possible, without departing from the idea and scope of the claimed invention. Accordingly, one of ordinary skill would understand the scope of the claimed invention is not to be limited by the above explicitly described embodiments but by the claims and equivalents thereof

What is claimed is:

1. A method of controlling a head-up display for a vehicle, the method comprising:
    performing a distance measurement using a displacement sensor for measuring a distance to a face of a driver in a vehicle; and
    performing a display position adjustment comprising adjusting a display position and a display angle of an image projected on a windshield or combiner of the vehicle based on the measured distance to the face of the driver,
    wherein performing the distance measurement comprises:
        measuring, using the displacement sensor, a plurality of distances while adjusting a measurement angle of the displacement sensor such that the plurality of distances are respectively measured at a plurality of measurement angles of the displacement sensor; and
        calculating the distance to the face of the driver based on the plurality of distances measured at the plurality of measurement angles of the displacement sensor.

2. The method of claim 1, wherein calculating the distance to the face comprises determining, from the plurality of measurement angles of the displacement sensor, a first measurement angle as a measurement angle corresponding to a starting position of the face, the first measurement angle corresponding to a first distance that is first to decrease at a predetermined rate or higher after a highest measurement angle through gradually lowered measurement angles at which the plurality of distances are measured, respectively.

3. The method of claim 2, wherein determining the first measurement angle as the measurement angle corresponding to the starting position of the face comprises determining whether all of the plurality of distances measured at a predetermined number of the measurement angles of the displacement sensor after the first measurement angle is within a predetermined range from the first distance corresponding to the first measurement angle of the displacement sensor, and if yes, determining the first measurement angle as the measurement angle corresponding to the starting position of the face.

4. The method of claim 3, further comprising calculating the distance to the face based on the first distance corresponding to the first measurement angle of the displacement sensor and at least one of the plurality of distances measured at the predetermined number of the measurement angles of the displacement sensor after the first measurement angle.

5. The method of claim 2, wherein performing the display position adjustment comprises adjusting the display position and the display angle of the image based on the first distance and first measurement angle.

6. The method of claim 2, wherein calculating the distance to the face comprises determining a driver absence in response to detecting that the plurality of distances measured at the plurality of measurement angles is greater than a reference distance.

7. The method of claim 1, wherein calculating the distance to the face comprises calculating the distance to the face based on at least some of the plurality of distances measured at the plurality of measurement angles of the displacement sensor that cause the measured distances to be generated smaller by at least a predetermined ratio than a distance measured at a highest measurement angle of the displacement sensor.

8. The method of claim 1, wherein adjusting the measurement angle of the displacement sensor comprises adjusting a tilting angle of the combiner.

9. The method of claim 1, further comprising:
prior to performing the distance measurement, reading driver position information from a driver-position integrated memory system (IMS) and performing a seat position adjustment, the driver position information including a predetermined distance to the face of the driver; and
providing a driver mismatch indication or driver absence indication responsive to detecting that the measured distance to the face of the driver differs by at least a predetermined ratio from the predetermined distance included in the driver position information.

10. The method of claim 1, wherein performing the display position adjustment comprises adjusting the display position and the display angle of the image based on data from a seat pressure sensor and the measured distance to the face of the driver.

11. A head-up display for a vehicle, comprising:
a displacement sensor configured to measure a distance to a face of a driver in a vehicle;
a light source and display panel configured in combination to display an image;
an optical system positioned to receive the image displayed by the display panel and configured to project the image displayed on the display panel onto a windshield or combiner of the vehicle;
a control unit connected to the optical system and configured to control the optical system to adjust a display position and a display angle of the projected image based on the measured distance to the face of the driver; and
a displacement sensor angle controller configured to adjust a measurement angle of the displacement sensor, wherein the control unit is further configured to measure a plurality of distances at a plurality of measurement angles of the displacement sensor by adjusting the measurement angle of the displacement sensor, and to calculate the distance to the face of the driver based on the plurality of distances respectively measured at the plurality of measurement angles.

12. The head-up display of claim 11, wherein the control unit is further configured to determine, from the plurality of measurement angles of the displacement sensor, a first measurement angle as a measurement angle corresponding to a starting position of the face, the first measurement angle corresponding to a first distance that is first to decrease at a predetermined rate or higher after a highest measurement angle through gradually lowered measurement angles at which the plurality of distances are measured, respectively.

13. The head-up display of claim 12, wherein the control unit is further configured to determine whether the plurality of distances measured at a predetermined number of the measurement angles after the first measurement angle is within a predetermined range from the first distance corresponding to the first measurement angle, and if yes, determine the first measurement angle as the measurement angle corresponding to the starting position of the face.

14. The head-up display of claim 13, wherein the control unit is further configured to calculate the distance to the face based on the first distance corresponding to the first measurement angle and at least one of the plurality of distances measured at the predetermined number of the measurement angles after the first measurement angle.

15. The head-up display of claim 12, wherein the control unit is further configured to adjust the display position and the display angle of the image based on the first distance and first measurement angle.

16. The head-up display of claim 11, wherein the control unit is further configured to calculate the distance to the face based on, from the plurality of distances measured at the plurality of measurement angles, at least some of the plurality of distances measured at one or more measurement angles that cause the measured distances to be generated smaller by at least a predetermined ratio than a measured distance at a highest measurement angle.

17. The head-up display of claim 11, wherein:
the head-up display comprises a combiner configured to display vehicle information, the combiner including a combiner tilting angle adjuster configured to adjustably tilt the combiner vertically,
the displacement sensor is located in the combiner, and
the displacement sensor angle controller comprises the combiner tilting angle adjuster.

18. The head-up display of claim 11, wherein the control unit is further configured to:
read, from a driver-position integrated memory system (IMS), a driver position information including a predetermined distance to the face of the driver, and
provide a driver mismatch indication or driver absence indication responsive to detecting that the measured distance to the face of the driver differs by at least a predetermined ratio from the predetermined distance included in the driver position information.

19. The head-up display of claim 11, wherein the control unit is further configured to adjust the display position and the display angle of the image based on data from a seat pressure sensor and the measured distance to the face of the driver.

20. The head-up display of claim 12, wherein the control unit is further configured to determine a driver absence in response to detecting that the plurality of the distances measured at the plurality of measurement angles is greater than a reference distance.

* * * * *